UNITED STATES PATENT OFFICE 2,494,546

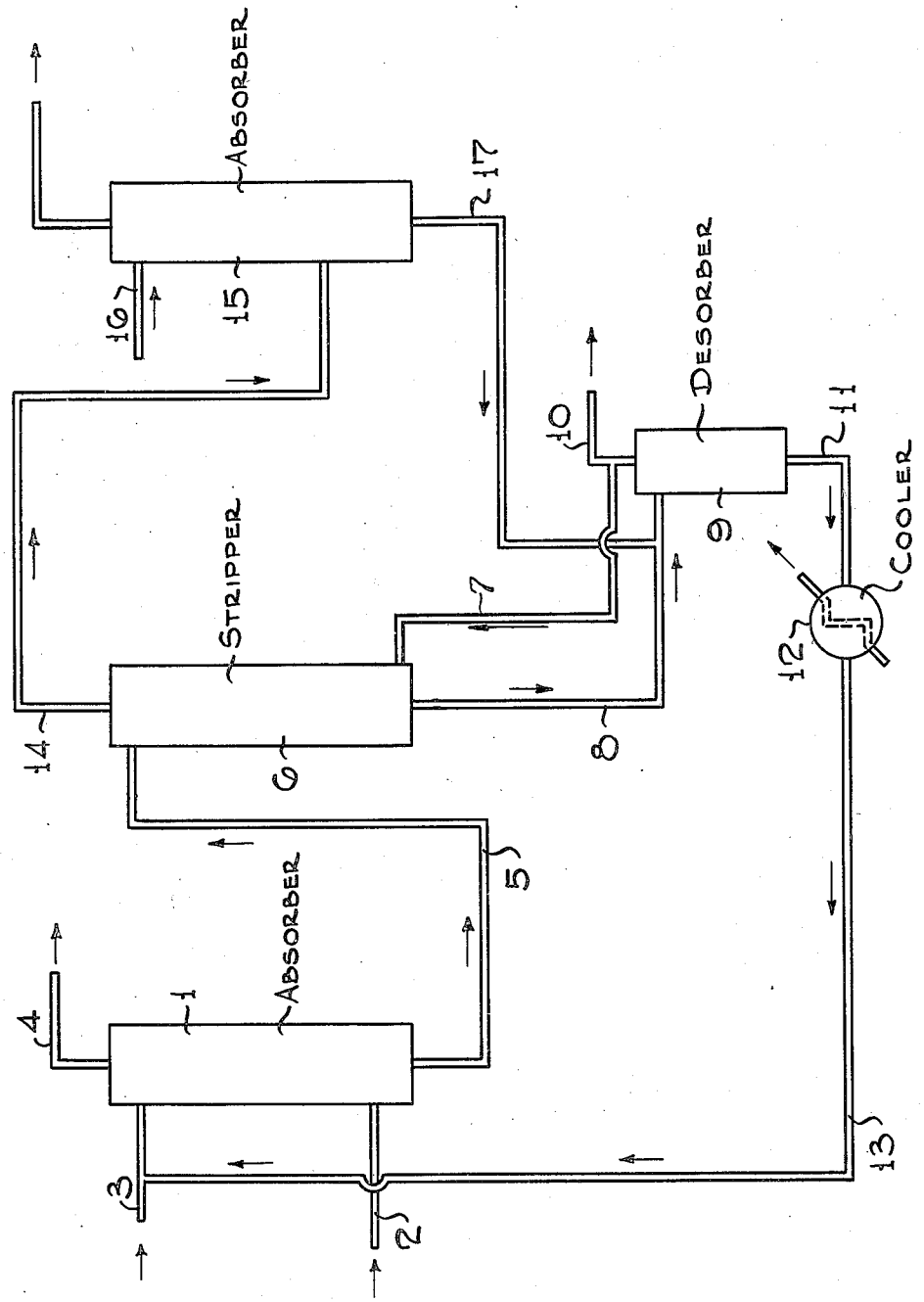

SEPARATION OF OLEFINS

Egi V. Fasce, Baton Rouge, La., assignor to Standard Oil Development Company, a corporation of Delaware Application December 13, 1945, Serial No. 634,887

3 Claims. (Cl. 260—677)

This invention relates to improvements in the separation of olefins, and relates particularly to the separation of mono-olefins having four carbon atoms to the molecule from other olefins having the same number of carbon atoms to the molecule.

It is known that cuprous salt solutions absorb olefins having four to seven carbon atoms to the molecule to a greater extent than paraffins and diolefins having four to seven carbon atoms to the molecule to a greater extent than mono-olefins. It is also known that the solubility of olefins in cuprous salt solutions decreases as the number of carbon atoms in the molecule of each of these olefins increases.

Of the various olefin types, it has been found that the solubility in cuprous salt solutions of olefins having four carbon atoms to the molecule and the same number of carbon atoms in the molecule varies according to the structure of the hydrocarbons, the normal mono-olefins having the double bond in the "1" position being much more soluble than the other normal or tertiary olefins. The solubility, at 0° C. and sufficient pressure to maintain the hydrocarbons in liquid phase, of hydrocarbons having four carbon atoms to the molecule in a cuprous salt solution of 3 mols of cuprous ion, 4 mols of acetate, and 11 mols of total ammonia is illustrated by the following table:

|  | Boiling Point of Pure Hydrocarbon, °C. | Vols. Gas Absorbed/ Vol. Solution |
|---|---|---|
| Butadiene | −4.41 | 26.4 |
| Butene-1 | −6.32 | 4.6 |
| Isobutylene | −6.93 | 0.88 |
| Butene-2 | 0.86 to 3.64 | 0.7 |
| Isobutane | −11.72 | negligible |
| Normal Butane | −0.55 | negligible |

It is not intended to limit this process to the sole use of a solution of cuprous acetate salt referred to above as other cuprous salt solutions may be used. The other cuprous salt solutions that may be used are the sulfate, phosphate, lactate, tartrate, formate, borate, carbonate, chloride, fluoride, glycolate, thioglycolate, benzoate, salicylate, benzene sulfonate, orthophosphate, cyanide, thiocyanate, maleate, etc. These cuprous salts are used in conjunction with amine derivatives, such as ethanolamine, ammonium chloride and the various acids, hydrochloric, etc.

Similarly, such cuprous salt solutions may be used to separate mixtures of isomeric diolefins of the same molecular weight.

The following specific examples are given to illustrate the solubilities of the various olefins:

Example 1

Pure butene-1 was contacted in the liquid phase at −10° C. with ammoniacal cuprous acetate solution (3.1 mols of cuprous ion, 11.0 mols of ammonia and 5.15 mols of acetate). At equilibrium the cuprous solution absorbed 6.0 gaseous volumes (corrected to 0° C. and 1 atmosphere) of butene-1/volume of cuprous solution.

Example 2

Pure butene-2 was contacted similarly with a solution of the same composition. At equilibrium the copper solution absorbed 0.6 gaseous volume of butene-2 per volume cuprous solution.

Example 3

Pure isobutylene was contacted similarly with a solution of the same composition. At equilibrium the copper solution absorbed 0.5 gaseous volume of isobutylene per volume cuprous solution.

An example of a practical use of this property is in the manufacture of butyl rubber by polymerization of isobutylene with a diolefin such as isoprene. The fresh isobutylene, as prepared by extraction in 65% sulfuric acid and regeneration, contains considerable butene-2 and some butene-1. The butene-2 can be largely removed by fractionation, but the butene-1 stays with the isobutylene cut and tends to build up in the isobutylene recycling in the butyl rubber plant. This build up of butene-1, which is deleterious to the polymerization process, can be reduced by bleeding off part of the recycle isobutylene, scrubbing with cuprous solution to remove all or part of the butene-1 and returning the isobutylene.

Use of cuprous solution for butene-1 removal can be accomplished in a manner very similar to extraction of butadiene. The liquid C4 cut may be extracted countercurrently with the solution at −7° C. or lower, the rich solution flashed if desired (to remove dissolved isobutylene) by raising the temperature or by stripping with concentrated butene-1 or by other known method, and the butene-1 finally removed by desorption from the solution at 72° C. to 83° C. For a given percentage removal and a given temperature, about six times as much solution is needed for butene-1 extraction as for butadiene. For substantial elimination of butene-1 from a butyl rubber plant circuit, complete butene-1 removal per pass is not necessary.

For the case where butadiene is used as diolefin in the butyl rubber plant and the isobutylene recycle contains butadiene, the butene-1 can also be removed by cuprous salt solution. In this case the butadiene is also extracted. Separation of the butadiene from the butene-1 is accomplished by two extractions in series or by suitable flashing or stripping of the rich solution to give three streams, the first rich in isobutylene, the second in butene-1, and the third rich in butadiene.

For a further understanding of the invention, reference may be had to the accompanying drawing in which the single figure is an elevational view, generally diagrammatic, showing an apparatus embodying the improvements of the present invention.

Referring, therefore, to the drawing, a $C_4$ cut containing butanes, butadiene, butene-1, butene-2 and isobutylene is passed to an absorption tower 1 through line 2. Tower 1 contains either bubble plates or packed sections and operates at about 0 pounds per square inch gauge and —7° C. Ammoniacal cuprous acetate solvent enters the top of tower 1 through line 3 and flows down the tower contercurrently to the hydrocarbon vapors rising in the tower. Unabsorbed hydrocarbon vapors leave the top of tower 1 through line 4. In tower 1, substantially all the butadiene and normal butene-1 contained in the feed are dissolved in the solvent, while the butanes, isobutylene and butene-2 are removed overhead through line 4. The solvent containing dissolved butadiene and butene-1 flows from tower 1 through line 5 to stripper 6 wherein it is contacted countercurrently with recycled butadiene vapors introduced into the bottom of the stripper 6 through line 7. In stripper 6, most of the butene-1 is stripped from the solvent together with some butadiene, thereby leaving in solution essentially pure butadiene. The solvent leaves the bottom of stripper 6 through line 8 and is heated to 77° C. and introduced into the top of desorber 9 above the top plate. This desorber contains either bubble plates or a combination of plates and packed sections and is maintained at a temperature of 77° C. Under these conditions essentially pure butadiene vapor is withdrawn through line 10 as product. The solvent passes down through desorber 9 and is withdrawn through line 11, cooled to —7° C. in cooler 12 and returned by lines 13 and 3 to the top of tower 1.

The overhead from stripper 6 is removed through line 14 and passed to a second absorption tower 15 similar to tower 1 where it is again contacted with cuprous ammonium acetate solution introduced through line 16 at a temperature of 72° C. to yield essentially pure butene-1 overhead and a solution of butadiene in cuprous ammonium acetate which is passed by line 17 to desorber 9 for the removal of butadiene.

The cuprous solution may also be used to separate butene-1 from refinery $C_4$ cuts where isobutylene, butene-1, butene-2, isobutane, and normal butane are present. Here the $C_4$ cut is advantageously fractionated first to give a more concentrated butene-1 cut, containing isobutane and isobutylene, and eliminating butene-2 and normal butane.

The cuprous solution may then be stripped of butene-1 and butene-2 by passing butadiene into the solution which preferentially displaces the butene-1 and butene-2. If desired, the ammoniacal cuprous acetate solution may be placed in a tower, the lower part of which is heated, expelling the butene-1 and butene-2 to the upper part of the tower where the butene-1 and butene-2 is contacted with another volume of 3 N ammoniacal cuprous acetate solution. In this ammoniacal cuprous acetate solution is found the major fraction of butene-1 and the unabsorbed portion consists of substantially butene-2.

*Example 4*

A similar extraction of a hydrocarbon containing 25% butadiene and 75% of 2:1 ratio of butene-1 to butene-2 yielded an extract product of 88% to 89% butadiene purity and 11% to 12% of substantially pure butene-1.

A two- or three-stage extraction process of ammoniacal cuprous acetate solution and butene-1 and butene-2 mixture will readily yield a product of 98% to 100% butene-1 purity. The extraction is carried out with 4:20 ratio cuprous solution to butene mixture in either countercurrent-liquid or gas-liquid phase operation at atmospheric pressure to 200 lbs. per square inch and —29° C. to 38° C. and desorption at 77° C. should result in the desired extraction product of pure butene-1. The raffinate product will consist of essentially pure butene-2.

As the above examples indicate, an ammoniacal cuprous acetate solution, a cuprous pyridine sulfate solution, or other cuprous salts, may be used to separate an alpha olefin, such as butene-1 from isomeric olefins of the same molecular weight, such as butene-2, and/or isobutylene.

What is claimed is:

1. The process of separating a mixture of hydrocarbons consisting of butene-1 and butene-2 which comprises contacting said mixture with a cuprous ammonium salt solution at a temperature between —29° C. and +38° C. and pressure from atmospheric to 200 pounds per square inch to form an extract solution containing the butene-1 and a raffinate fraction containing the butene-2.

2. The process of separating a mixture of hydrocarbons consisting of butene-1, butene-2 and butadiene which comprises contacting said mixture in a first absorption zone with a cuprous ammonium acetate solution at a temperature between —29° C. and +38° C. and pressures from atmospheric to 200 pounds per square inch to form an extract solution containing butadiene and butene-1 and a raffinate fraction containing the butene-2, passing the extract solution into a stripping zone countercurrent to a stream of butadiene whereby the butene-1 is displaced from the solution, removing a mixture of butene-1 and butadiene overhead from the stripping zone and introducing it into a second absorption zone where it is contacted with cuprous ammonium acetate solution at a temperature between 72° C. and 83° C. to form an extract solution containing butadiene and a raffinate solution containing butene-1.

3. The process of separating a $C_4$ hydrocarbon fraction containing butanes, butene-1, butene-2, isobutylene and butadiene which comprises contacting said $C_4$ cut with a cuprous ammonium acetate solution at a temperature between —29° C and +38° C. and pressure from atmospheric to 200 pounds per square inch to form an extract solution containing butadiene and butene-1 and a raffinate fraction containing butanes, butene-2 and isobutylene, passing the extract solution into a stripping zone countercurrent to a stream of butadiene whereby the butene-1 is displaced from the solution, removing a mixture of butene-1 and butadiene overhead from the stripping zone and introducing it into a second absorption zone where it is contacted with cuprous ammonium acetate solution at a temperature between 72° C. and 83° C. to form an extract solution containing butadiene and a raffinate solution containing butene-1.

EGI V. FASCE.

REFERENCES CITED

The following references are of record in the file of this patent:

UNITED STATES PATENTS

| Number | Name | Date |
|---|---|---|
| 2,005,500 | Joshua | June 18, 1935 |
| 2,342,990 | Welling | Feb. 29, 1944 |
| 2,386,300 | Drennan et al. | Oct. 9, 1945 |
| 2,386,356 | Schulze et al. | Oct. 9, 1945 |
| 2,395,529 | Arnold | Feb. 26, 1946 |
| 2,411,588 | Packie | Nov. 26, 1946 |
| 2,417,048 | Antonio | Mar. 11, 1947 |